United States Patent [19]

De Visser

[11] 4,005,615
[45] Feb. 1, 1977

[54] RESET FOR THREADED ENCLOSURE
[75] Inventor: Christian De Visser, Clinton, Ill.
[73] Assignee: General Electric Company, New York, N.Y.
[22] Filed: Mar. 7, 1975
[21] Appl. No.: 556,087

Related U.S. Application Data
[63] Continuation of Ser. No. 410,956, Oct. 29, 1973, abandoned.

[52] U.S. Cl. .................................................. 74/504
[51] Int. Cl.² .......................................... G05G 1/08
[58] Field of Search ........................ 74/504; 200/50

[56] References Cited
UNITED STATES PATENTS

| | | | |
|---|---|---|---|
| 2,970,488 | 2/1961 | Skillings | 74/110 |
| 3,016,431 | 1/1962 | Steigerwald | 200/50 C |
| 3,137,775 | 6/1964 | Delaney | 200/50 C |
| 3,306,696 | 2/1967 | Tann | 74/504 |

Primary Examiner—Benjamin W. Wyche
Assistant Examiner—Wesley S. Ratliff, Jr.
Attorney, Agent, or Firm—Stephen A. Young; Walter C. Bernkopf; Robert A. Cahill

[57] ABSTRACT

An explosion proof threaded enclosure for motor starting devices, such as an overload relay having a reset button extending therefrom. The enclosure includes a mechanism for resetting the relay from a position external to the enclosure. The reset mechanism includes a handle mounted outside of the enclosure, a connecting rod having one end thereof mechanically coupled to the handle and mounted within the enclosure for reciprocal movement from an initial position to a reset position when the handle is moved in a first direction by an operator, and a rotatably mounted actuating member mechanically coupled to the other end of the rod and having a portion thereof positioned adjacent the reset button of the overload relay when the rod is in its initial position. When the rod is moved to the reset position, the actuating member is moved to depress the reset button of the overload relay to reset the relay. The other end of the rod has a hook section which is positioned in an elongated aperture in the actuating member. The depth of the bight of the hook section is shorter than the length of the elongated aperture. Also, when the rod is in the initial position and the actuating member is manually moved by the operator to depress the reset button, the major axis of the elongated aperture and the plane of the hook section of the rod are aligned, and the rod is readily detachable from the actuating member for facilitating the removal of the overload relay from the enclosure.

5 Claims, No Drawings

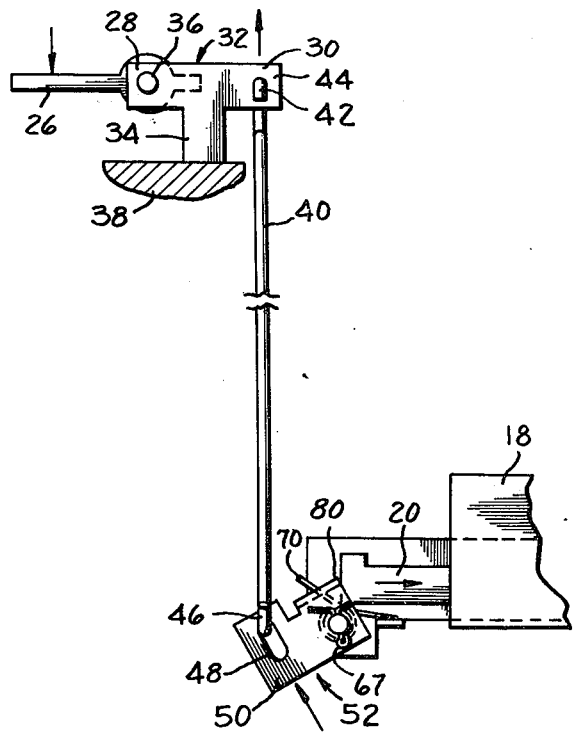

U.S. Patent   Feb. 1, 1977   4,005,615
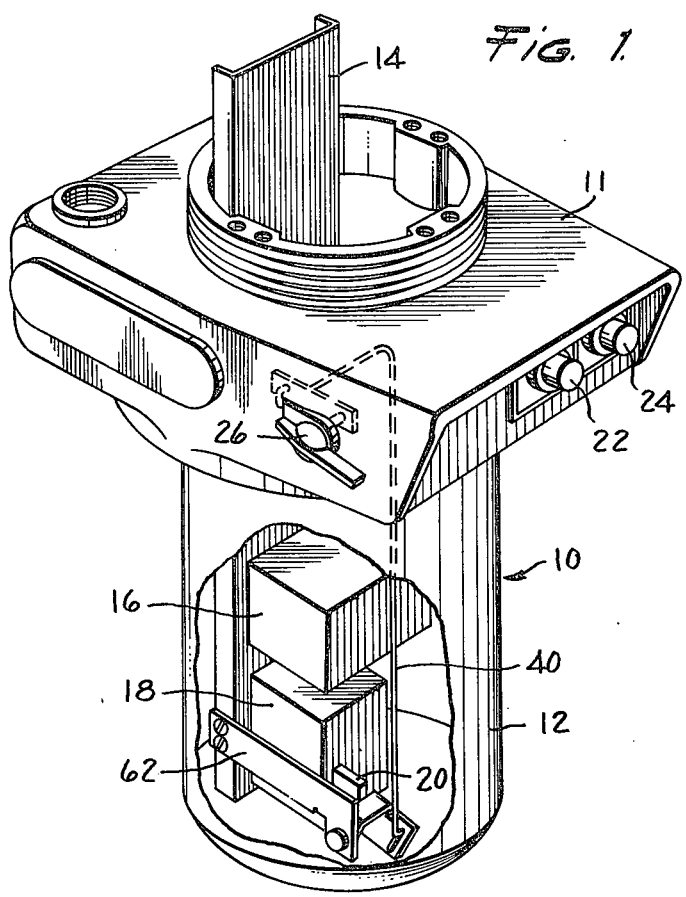
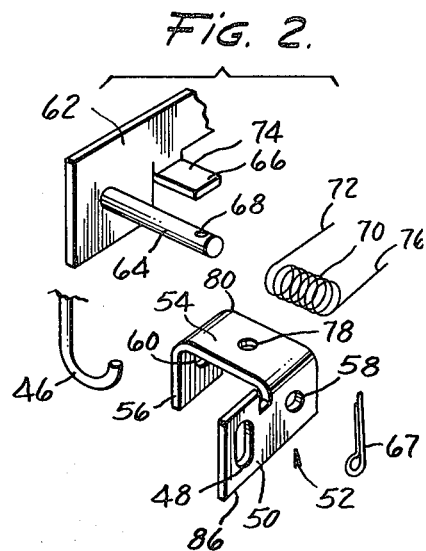
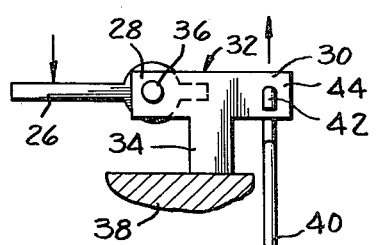
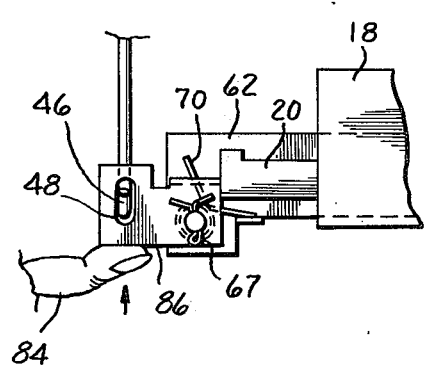
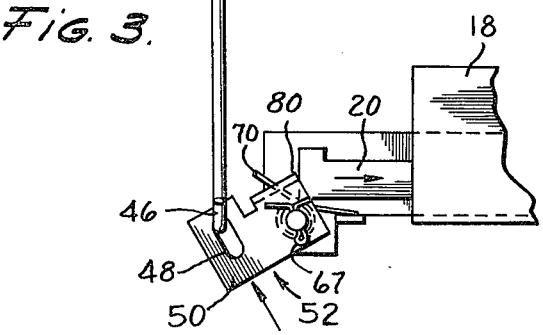

4,005,615

RESET FOR THREADED ENCLOSURE

This is a continuation of application Ser. No. 410,956, filed Oct. 29, 1973, now abandoned.

BACKGROND OF THE INVENTION

1. Field Of The Invention

This invention relates to an explosion proof threaded enclosure for motor starting devices that include an overload relay having a reset button extending therefrom, and more particularly to the reset mechanism for the overload relay which is manually operable from the exterior of the enclosure.

2. Description Of The Prior Art

An explosion proof threaded enclosure for motor starters and motor starting devices, such as contactors and overload relays having reset buttons extending therefrom of the type described in U.S. Pat. No. 3,016,431, have been used in hazardous environments, such as oil fields. The enclosure, and the motor starting devices mounted therein, are generally delivered to the oil field, at which time the devices are removed from the enclosure to facilitate the connection of electrical conductors thereto. Upon completion of the electrical wiring of the devices, they are repositioned within the enclosure. The enclosure is sealed and then permanently installed.

The enclosure is provided with an externally mounted handle for resetting the overload relay. This reset handle is generally mechanically coupled to one end of a connecting rod which is mounted within the enclosure. The other end of the rod is mechanically coupled to an actuating member. This actuating member is rotatably mounted at one end on a support member which holds the overload relay. The rod is so coupled to the actuating member that the overload relay cannot be removed from the enclosure without first either decoupling the rod from the actuating member or detaching the actuating member from the support member which holds the overload relay. Decoupling of the rod from the actuating member can require removal of either a cotter pin, screw or bolt and nut. Similarly if the actuating member is to be decoupled from the support member, bolts and nuts used to mechanically couple the actuating member to the support member must first be removed. This procedure in the oil field is time consuming and very difficult, since the workmen often are either wearing heavy gloves or have their bare hands covered with dirt and grease. Furthermore, if the cotter pin, screw or bolts and nuts become misplaced, the motor starting devices cannot be placed into operation, and the enclosure is rendered useless.

OBJECTS OF THE INVENTION

It is therefore an object of this invention to provide an explosion proof threaded enclosure for motor starting devices which can be easily electrically wired under field operating conditions.

It is another object of this invention to provide an improved reset mechanism for an overload relay, which is installed within an explosion proof threaded enclosure, wherein the reset mechanism can be easily disconnected to facilitate the removal of the overload relay from the enclosure for connection of electrical conductors to the relay and other motor starting devices.

Other objects of the invention will be pointed out in and understood from the following.

SUMMARY OF THE INVENTION

In accordance with a broad aspect of the invention there is provided an explosion proof threaded enclosure for a motor starting device, such as an overload relay having a reset button extending therefrom. The enclosure includes a mechanism for resetting the relay from a position external to the enclosure. The reset mechanism includes a handle rotatably mounted on the exterior of the enclosure, a connecting rod having one end thereof mechanically coupled to the handle and positioned within the enclosure for reciprocal movement between an initial position and a reset position, and an actuating member which is mechanically coupled to the other end of the rod and pivotally mounted on a support member that holds the overload relay. A section of the actuating member is positioned adjacent the reset button of the overload relay when the rod is in the initial position, and that section of the actuating member engages and depresses the reset button when the rod is moved by the handle to the reset position. The other end of the rod has an arcuate or hook section which is positioned in an elongated aperture in another section of the actuating member. The depth of the bight of the hook section of the rod is less than the length of the aperture in the actuating member. When the rod is in the initial position and the actuating member is moved to depress the reset button of the relay, the major axis of the elongated aperture becomes aligned with the plane of the hook section of the rod so that the rod can be disconnected from the actuating member to facilitate the removal of the overload relay and the support member from the threaded enclosure when electrical connections are to be made to the motor starting devices.

BRIEF DESCRIPTION OF THE DRAWINGS

FIG. 1 is a partially broken away perspective view of the enclosure showing the motor starting devices and the reset mechanism for the overload relay;

FIG. 2 is an enlarged exploded perspective view showing the actuating member of the reset mechanism and those elements which are interconnected therewith;

FIG. 3 is a side elevational view of the reset mechanism when the reset rod is in its initial position; and FIG. 4 is a partial side elevational view of the reset mechanism when the rod is in the initial position and the actuating member has been moved to that position necessary to facilitate the disengagement of the rod from the actuating member.

DESCRIPTION OF THE PREFERRED EMBODIMENT

Details of the invention will now be explained with reference to FIGS. 1 through 4.

As shown in FIG. 1 there is provided an explosion proof threaded enclosure of the type generally described and shown in U.S. Pat. No. 3,016,431. The enclosure generally includes a housing 11, a lower dome-like closure member 12 removably mounted thereon, and an upper dome-like closure member (not shown) also removably mounted thereon. Using standard mounting and fastening means, a rigid flat elongated support member 14 is fixed and positioned within the interior of enclosure 10. Motor starting devices, such as a standard contactor 16 and an overload relay 18, are fastened to support member 14 using standard mounting techniques. Overload relay 18 has a reset button 20 extending therefrom for resetting the relay when the reset button is depressed. Respective start and stop buttons 22 and 24 for controlling the energizing and deenergizing of the motor starting devices are mounted on the exterior of housing 11.

Means for resetting the overload relay from a position external to the enclosure is provided as follows. A handle 26, rotatably mounted on the exterior of housing 11, is fixed to one end 28 of a cross bar 30 of a T-shaped lever 32 located within the enclosure. Lever 32 also has a vertical base portion 34 extending from cross bar 30. Lever 32 and handle 26 are fixed together and are rotatably movable together about a pivot point 36 but are restrained in their clockwise movement (as viewed in FIG. 3) by abutment of the bottom surface of base portion 34 of T-shaped lever 32 against an internally extending flanged section 38 of enclosure 10, which determines the initial position of handle 26 and lever 32. A connecting rod 40 is mounted for reciprocal movement between an initial and a reset position within the enclosure. One end 42 of rod 40 is pivotally fastened, using standard fastening techniques, to the other end 44 of cross bar 30 of lever 32. The other end of rod 40 is formed to constitute an arcuate or hook section 46. Hook section 46 is receivable within an aperture 48 in a first section 50 of a rotatably mounted actuating member 52, and engages section 50.

Actuating member 52, as best seen in FIG. 2, further comprises a second section 54, which is positioned approximately at a right angle to and is disposed between first section 50 and a third section 56. Sections 50 and 56 have respective holes 58 and 60 extending therethrough, which holes are coaxial. A rigid support bracket 62 is positioned adjacent overload relay 18, and has one end thereof affixed to support member 14 using standard fastening techniques. A pin 64 extends from a hole (not shown) in and at approximately right angles to bracket 62. Also extending from bracket 62 is a flanged portion 66. Pin 64 passes through axially aligned holes 58 and 60 in respective sections 50 and 56 of actuating member 52. Actuating member 52 is thereby pivotally mounted on pin 64, and is held thereto using standard fastening techniques, such as cotter pin 67 which passes through a hole 68 in that end of pin 64 which is distal from bracket 62.

Means for urging second section 54 of actuating member 52 away from reset button 20 in overload relay 18 is provided by a spring 70, which is mounted on pin 64 between sections 50 and 56 of actuating member 62. One end 72 of spring 70 is positioned on the top surface 74 of flanged portion 66 extending from support bracket 62. The other end 76 of spring 70 is uncoiled in the clockwise direction (using FIG. 2 as a reference) and is positioned within a hole 78 in section 54 of actuating member 52 to urge second section 54 of actuating member 52 to move in the counterclockwise direction (using FIG. 3 as a reference) until rod 40 is in the initial position shown in FIG. 3, and an edge 80 of second section 54 of actuating member 52 is positioned adjacent reset button 20 of relay 18. Actuating member 52 is limited in movement in the counterclockwise direction (using FIG. 3 as a reference) by rod 40, which is pivotally connected by its hook section 46 to actuating member 52, and member 52 and rod 40 are held in their initial position established by the abutment of the bottom surface of vertical portion 34 of T-shaped lever 32 against flanged portion 38 of the enclosure. Aperture 48 in section 50 of actuating member 52 is elongated and is so dimensioned that it major axis (axial length) is greater than the depth of the bight, or the axial length (in the direction of the longitudinal axis of rod 40), of hook section 46 of rod 40, so that the hook section is positionable within and removable from aperture 48 when the major axis of aperture 48 is positioned parallel to both the longitudinal axis of rod 40 and the plane of hook section 46.

in operation, to reset overload relay 18, an operator moves handle 26 counterclockwise (using FIG. 3 as a reference) by applying sufficient force to overcome the biasing force or spring 70. Thusly, T-shaped lever 32 is moved in a counterclockwise direction to pull rod 40 toward its reset position. Rod 40 in turn moves actuating member 52 in the clockwise direction (using FIG. 3 as a reference) so that edge 80 of section 54 of actuating member 52 presses against and depresses reset button 20 to reset overload relay 18. Upon release of handle 26 by the operator, spring 70 urges actuating member 52 to retract or move in a counterclockwise direction (using FIG. 3 as a reference). Actuating member 52 then pulls rod 40 toward its initial position while rod 40 moves T-shaped lever 32 and handle 26 in the clockwise direction until the bottom surface of vertical portion 34 of T-shaped lever 32 abuts interior flanged section 38 of the enclosure.

When the enclosure is brought to an oil field for final installation and operation, elongated support member 14 is removed from the enclosure so that appropriate conductors can be pulled into the enclosure. to facilitate the removal of support member 14 from the interior of the enclosure, rod 40 must first be disconnected from actuating member 52. This is accomplished by having the operator press his finger 84 against an edge 86 of section 50 of actuating member 52 to move actuating member 52 in the clockwise direction (using FIG. 4 as a reference) against the bias of spring 70 and while rod 40 remains in its initial position, until the major axis of elongated aperture 48 in section 50 of actuating member 52 is aligned with both the longitudinal axis of rod 40 and the plane of hook section 46, so that the hook section can be removed and disengaged from section 50 of actuating member 52.

After the electrical conductors are electrically connected to the overload relay and the other motor starting devices, and support bracket 14 is repositioned and mounted within the enclosure, the reset mechanism is reassembled by again aligning the major axis of elongated aperutre 48 in section 50 of actuating member 52 with both the longitudinal axis of rod 40 and the plane of hook section 46, while rod 40 is in its initial position, so that hook section 46 can pass through the elongated aperture. The operator then releases actuating member 52, and spring 70 urges the actuating member to move in the counterclockwise direction (using FIG. 4 as a reference) until it is stopped and prevented from moving any farther by its engagement with hook section 46 of rod 40.

It is thus seen that the mechanism for resetting the overload relay, which is mounted within the explosion proof threaded enclosure, can be easily assembled and disassembled without having to remove parts, such as cotter pins, screws or nuts and bolts, which parts can be easily misplaced and lost.

Although the invention has been described with reference to a specific embodiment thereof, numerous modifications are possible without departing from the invention and it is desired to cover all modifications falling within the spirit and scope of this invention.

What I claim as new and desire to secure by Letters Patent of the United States is:

1. In a threaded explosion proof enclosure for motor starting devices, the combination of a rigid elongated flat support member mounted within said enclosure, an overload relay mounted on said support member, said overload relay having a reset button extending therefrom, and reset means for depressing said reset button to reset said overload relay comprising:
   a. a handle mounted external to said enclosure for enabling said overload relay to be reset from outside of said enclosure;
   b. a rod mounted for reciprocal movement within said enclosure;
   c. means for mechanically coupling one end of said rod to said handle, whereby upon movement of said handle in a first direction by an operator, said rod moves from an initial position to a reset position;
   d. an actuating member having a first, a second and a third section, said second section having an initial position adjacent said reset button of said overload relay;
   e. means for pivotally mounting said actuating member to said support member;
   f. means for biasing said second section of said actuating member to its initial position adjacent said reset button of said overload relay and to hold said rod in its initial position;
   g. means for mechanically coupling another end of said rod to said first section of said actuating member, whereby when said rod is moved by said handle to the reset position, said second section of said actuating member depresses said reset button to reset said overload relay, and when said handle is released by the operator, said second section of said actuating member is returned by said biasing means to its initial position adjacent said reset button and said rod is returned to its initial position; and
   h. said means for mechanically coupling said rod to said actuating member further comprising:
      1. said other end of said rod constituting a hook section; and
      2. said first section of said actuating member having an aperture for receivinng and engaging said hook section of said rod, said aperture in said first section being elongated to have a major axis longer than the bight of said hook section of said rod, whereby when said rod is in its initial position, and said actuating member is manually moved by the operator to depress said reset button until the major axis of said aperture in said first section is aligned with the plane of said hook section, said hook section is removable from said first section of said actuating member to facilitate the removal of said support member from said enclosure.

2. The combination according to claim 1, wherein said second section of said actuating member extends between and at approximately right angles to said first and third sections, and said first and third sections of said actuating member being coaxially apertured for rotatably mounting of said actuating member.

3. The combination according to claim 2, wherein said pivotally mounting means comprises:
   a. a support bracket having one end fixed to said support member; and
   b. a pin extending from said support bracket and passing through said third and first sections of said actuating member for effecting the rotatable mounting of said actuating member.

4. The combination according to claim 3, wherein said biasing means is comprised of a spring mounted on said pin between said first and third sections of said actuating member for urging said section of said actuating member toward its initial position adjacent said reset button of said overload relay.

5. The combination according to claim 1, wherein said means for coupling said rod to said handle comprises:
   a. a T-shaped lever having a vertical base portion and a horizontal cross bar, one end of said cross bar being pivotally connected to said one end of said rod; and
   b. means fixedly securing said handle to the opposite end of said cross bar of said T-shaped lever, whereby when the operator releases said handle, said biasing means biases said actuating member in a direction to cause said first section of said actuating member to pull said rod and said other end of said T-shaped lever until the bottom of said base portion of said T-shaped lever abuts an internal portion of said enclosure, thereby establishing the initial position of said handle, said T-shaped bracket, said rod and said actuating member.

* * * * *

UNITED STATES PATENT OFFICE
CERTIFICATE OF CORRECTION

PATENT NO. : 4,005,615
DATED : February 1, 1977
INVENTOR(S) : Christian De Visser It is certified that error appears in the above-identified patent and that said Letters Patent are hereby corrected as shown below:

Column 6, line 30, before "section", insert --second--.

Signed and Sealed this

Fifth Day of April 1977

[SEAL]

Attest:

RUTH C. MASON
*Attesting Officer*

C. MARSHALL DANN
*Commissioner of Patents and Trademarks*